US008350844B2

(12) United States Patent  (10) Patent No.: US 8,350,844 B2
Sharp et al.  (45) Date of Patent: Jan. 8, 2013

(54) MONITORING USER ATTENTION IN A COMPUTER-SIMULATED ENVIRONMENT

(75) Inventors: Christopher E. Sharp, Winchester (GB); Matthew Whitbourne, Horndean (GB)

(73) Assignee: International Business Machines Corporation, Armonk, NY (US)

(*) Notice: Subject to any disclaimer, the term of this patent is extended or adjusted under 35 U.S.C. 154(b) by 1086 days.

(21) Appl. No.: 12/108,932

(22) Filed: Apr. 24, 2008

(65) Prior Publication Data

US 2009/0051681 A1  Feb. 26, 2009

(30) Foreign Application Priority Data

Aug. 20, 2007  (GB) .................................. 07114587.4

(51) Int. Cl.
*G06T 15/00* (2011.01)
(52) U.S. Cl. ........................................ 345/419; 705/14.4
(58) Field of Classification Search .................. 345/419, 345/581, 619, 624; 705/14.68
See application file for complete search history.

(56) References Cited

U.S. PATENT DOCUMENTS

| 5,923,330 | A | 7/1999 | Tarlton et al. | |
|---|---|---|---|---|
| 6,396,509 | B1* | 5/2002 | Cheng | 715/706 |
| 7,155,680 | B2 | 12/2006 | Akazawa et al. | |
| 2002/0138607 | A1 | 9/2002 | O'Rourke et al. | |
| 2004/0015608 | A1 | 1/2004 | Ellis et al. | |
| 2005/0179685 | A1* | 8/2005 | Kake et al. | 345/419 |
| 2007/0011617 | A1 | 1/2007 | Akagawa et al. | |
| 2007/0043616 | A1* | 2/2007 | Kutaragi et al. | 705/14 |

OTHER PUBLICATIONS

D.Y. Cheng, Design of a virtual environment that employs attention-driven interaction and prioritization, Virtual Environments '98. Proceedings of the Eurographics Workshop, 1998, p. 114-23.
C. Peters; C. O'Sullivan, Bottom-up visual attention for virtual human animation, Proceedings 16th International Conference on Computer Animation and Social Agents, 2003, p. 111-17, IEEE Comput. Soc.
Christopher Peters, Towards Direction of Attention Detection for Conversation Initiation in Social Agents, Proceedings of AISB 2005 Symposium on Virtual Social Agents. Hatfield, England, 2005.
C. Bordeux; R. Boulie; D. Thalmann, An efficient and flexible perception pipeline for autonomous agents, Computer Graphics Forum, v 18, n 3, 1999, p. C23-9, C397, Blackwell Publishers for Eurographics Assoc.
M.B. Villamil; S.R. Musse; L.P.L. De Oliveira, A model for generating and animating groups of virtual agents, Intelligent Virtual Agents. 4th International Workshop, IVA 2003. Proceedings (Lecture Notes in Artificial Intelligence vol. 2792), 2003, p. 164-9, Springer-Verlag.

(Continued)

*Primary Examiner* — Xiao M. Wu
*Assistant Examiner* — Scott E Sonners
(74) *Attorney, Agent, or Firm* — Yee & Associates, P.C.; David A. Mims, Jr.

(57) ABSTRACT

Provided are methods, data processing systems and computer program product for monitoring user activity and monitoring the effectiveness of objects within a virtual environment such as an immersive, computer-simulated 3D environment. An embodiment of the invention monitors the attention given to a virtual object by one or more avatars, by associating a viewing region with each object that requires attention monitoring, and detecting when an avatar is within the viewing region of the object simultaneously with the object being within an attention region (typically a clipped field of view) of the avatar. The viewing region is a 3D volume within which a surface of the virtual object is deemed to be effectively viewable.

21 Claims, 5 Drawing Sheets

OTHER PUBLICATIONS

Anton Nijholt; Rutger Rienks; Job Zwiers; Dennis Reidsma, Online and off-line visualization of meeting information and meeting support, Visual Computer, v22, n 12, Dec. 2006, p. 965-976, Springer Verlag, Heidelberg, D-69121, Germany.

Kim Youngjun; Randall W. Hill, Jr.; David R. Traum, A Computational Model of Dynamic Perceptual Attention for Virtual Humans, 14th Conference on Behavior Representation in Modeling and Simulation (BRIMS), Universal City, CA, May 16-19, 2005.

W.H. Bares; L.S. Zettlemoyer; J.C. Lester, Habitable 3D learning environments for situated learning, Intelligent Tutoring Systems, 4th International Conference, ITS '98. Proceedings, 1998, p. 76-85.

D. Byron; T. Mampilly; V. Sharma; Xu Tianfang, Utilizing visual attention for cross-modal coreference interpretation, Modeling and Using Context. 5th International and Interdisciplinary Conference Context 2005. Proceedings (Lecture Notes in Artificial Intelligence vol. 3554), 2005, p. 83-96, Springer-Verlag.

Chia-Chen Kuo; Yi-Haur Shiau; Chen-Pey Huang; Cherng-Yeu Shen; Whey-Fone Tsai, Application of virtual reality in ecological farmland navigating system, Proceedings—Seventh International Conference on High Performance Computing and Grid in Asia Pacific Region, HPCAsia 2004, p. 285-288, IEEE Computer Society, Los Alamitos; Massey University, Palmerston, CA 90720-1314, United States; New Zealand.

Kang-Hyun Jo; Sung-Eun Kim; Kyung Sup Park, Interaction between agents from recognition of face direction and hand gestures in the virtual space, Proceedings KORUS 2000. The 4th Korea-Russia International Symposium on Science and Technology, 2000, pt. 2, p. 28-33 vol. 2, IEEE.

Hongbin Zha; Y. Makimoto; T. Hasegawa, Dynamic gaze-controlled levels of detail of polygonal objects in 3-D environment modeling, Second International Conference on 3-D Digital Imaging and Modeling (Cat. No. PR00062), 1999, p. 321-30, IEEE Comput. Soc.

K.C. Pramataris; D. Papakiriakopoulos; T. Motsios; G.I. Doukidis, A multidimensional approach to product advertisement in the virtual retail environment, Proceedings of the 8th European Conference on Information Systems, 2000, pt.2, p. 1059-65 vol. 2, Vienna Univ. Econ. & Bus. Adm.

\* cited by examiner

MONITORING USER ATTENTION IN A COMPUTER-SIMULATED ENVIRONMENT

FIELD OF INVENTION

The present invention relates to monitoring user activity and monitoring the effectiveness of objects within a computer-simulated environment, and provides data processing systems, methods and computer program products for use in such monitoring.

BACKGROUND

It is beyond question that the Internet has had an enormous impact on societies, businesses and individuals throughout the world. As a worldwide, publicly accessible network of interconnected computer networks, the Internet has enabled a large proportion of the world's population to gain access to vast amounts of information, to communicate via e-mail and file transfers and online chat rooms, and to complete any number of business activities and commercial transactions. With remote access to data processing systems, collaborative working, file sharing and voice-over-IP (VoIP) communication, the Internet has avoided the need for a great deal of business-related travel and achieved huge improvements in education and productivity.

Many innovators believe that future advances in Internet use will be dominated by immersive, computer-simulated, three-dimensional (3D) environments that can simulate spaces within the external world. Such environments are referred to herein as 'virtual worlds' (but are also known in the art as a 'metaverse', following Neal Stephenson's science fiction novel "Snow Crash", 1992, Bantam Books, USA). In a virtual world, computer users interact with each other, and with objects, via 'avatars' which are representations of a character that the user has associated with himself or herself. In an immersive 3D virtual world, avatars tend to be three-dimensional graphical representations of people (often stylized rather than an accurate representation of the user); but an avatar within an Internet forum may be a two dimensional (2D) image or icon. The terms 'avatar' and 'virtual world' as used herein are intended to encompass 2D icons in a two-dimensional virtual environment such as a conventional Internet application using the World Wide Web (e.g. a virtual shopping mall) as well as to refer to 3D representations of a user-associated character in an immersive, computer-simulated 3D environment.

In many 2D and 3D interactive computer games, it is well known for avatars to interact with each other and with their surroundings. In Second Life (an example Internet-based virtual world developed by Linden Research, Inc. ("Linden Lab") with contributions from its user community or "Residents"), users can simulate conversations between their avatars using text-based communication. This includes instant messaging for private conversations, and localized public broadcasts of text between avatars that are within a certain distance from one another. In virtual worlds such as Second Life, when an avatar comes into simulated physical contact with another avatar or a non-avatar virtual object, the computer that is simulating their environment applies a set of algorithms to simulate the effects of that contact; taking account of factors such as simulated gravity, conservation of momentum, conservation of energy, etc.

An avatar's field of view is also repeatedly recalculated as the avatar moves within the virtual world, and the avatar's field of view (or a cropped portion of it) is presented to the user via an image on a display screen. When an avatar moves within a massively multiplayer online role-paying game (MMORPG), many other avatars and non-avatar virtual objects will typically come within their field of view. An avatar-controlling user will choose to interact with some of these other avatars and non-avatar virtual objects, and will disregard others.

In many cases, it is sufficient to detect simulated physical contacts with other avatars and objects (when rules for calculating simulated physical effects need to be applied) and to allow the user to initiate communications and to respond to other avatars' attempts to communicate. Users can be left to decide and to remember which avatars and other objects they considered interesting but perhaps chose not to interact with. For example, a user may have chosen to avoid a simulated physical interaction, or chosen not to participate in a communication, and then the only record of the user's interest is in the user's memory. Many satisfactory computer games respond to simulated physical interaction events and leave the user to control other types of interaction.

SUMMARY

The inventors of the present invention have determined that it is both desirable and possible in a virtual world to implement novel approaches to monitoring user activity and monitoring the effectiveness of objects within the virtual world.

In a typical "real world" retail environment, a retail customer decides and remembers which objects passing within the customer's field of view are interesting, but it is difficult for anyone else to know what attention was given to a particular object. CCTV cameras or retail staff may be used to assess the apparent attention given by a customer to products within the retail environment, but this is very hard to automate and would require very intrusive monitoring of customers before the captured data can support any reliable assessment. Intrusive monitoring is a disincentive to many potential customers, even if the people conducting the monitoring are merely trying to monitor the effectiveness of their services or objects such as displayed warning signs, directions or advertisements.

In a typical Web environment, it would be possible to monitor the time that a Web application user spends within a particular Web site or the time that the user has a particular Web page displayed in their Web browser, but this is unreliable and does not enable automated monitoring of the attention given to particular objects within a Web page. Therefore it remains very difficult to determine the effectiveness of advertisements, warnings and other objects in the virtual environment unless the user clicks on (i.e. explicitly selects) the objects. It can be even more difficult to determine the attention given to objects in a 3D computer-simulated environment.

The inventors of the present invention have determined that it is possible to monitor the attention given to virtual objects (such as advertisements, 3D representations of products, warning signs, maps, directions, etc) that appear within a computer-simulated environment and which fall within the field of view of one or more avatars.

A first aspect of the present invention provides a method for automated monitoring of the attention given to a virtual object, in a computer-simulated environment, by at least one avatar-controlling computer user. As noted above, virtual objects may comprise advertisements embedded within the virtual world, or simulated 3D representations of commercial products, or warning signs or maps or instructions. It may be very important to determine the effectiveness of such objects in terms of the attention given to them by avatar-controlling users. If an object such as a warning sign, a set of instructions or an advertisement is ineffective, it may be necessary to add animation, to increase the object's size or to reposition the object, or to change the color of the object, or to change the font size of text within the object, or to change the pixel density of the object, or to add non-visual characteristics to the object. Such monitoring, and subsequent corrective actions, are enabled by the method of the present invention. It may also be necessary to monitor the attention given to an object by avatar-controlling users to measure the number of potential customers viewing an advertisement or 3D representation of a product.

In a first embodiment of the invention, a method for automated monitoring of the attention given by at least one avatar-controlling computer user to a virtual object within a computer-simulated environment comprises the steps of: associating a viewing region with the virtual object, within which viewing region avatars are deemed to be capable of viewing the virtual object; monitoring an attention region for an avatar; detecting when the virtual object is within the attention region of the avatar simultaneously with the avatar being within the viewing region of the virtual object; and generating an attention event in response to the detecting step.

The generation of an attention event preferably comprises transmitting data to an aggregator, where the transmitted data comprises information regarding the attention given by an avatar to the virtual object. The aggregator records the attention event in a data storage means, for example by updating an event counter. Aggregated records of the attention given by avatars to a particular virtual object can then be processed for purposes such as billing an advertiser or verifying the effectiveness of the object.

In one embodiment of the invention, the viewing region comprises a region of a computer-simulated environment that is defined by projecting a set of planes at a threshold viewing angle from each edge of a viewable surface of the virtual object. Avatars that are too distant from the viewable surface, or where the avatar's line of sight is at too large an angle from a line normal to the viewable surface, are outside the viewing region and are deemed to be incapable of viewing the virtual object. No attention event is generated for avatars outside the viewing region, even if the virtual object is within the attention region of the avatar.

The viewing region of a virtual object is selected such that the object can be displayed effectively on a typical display screen of an avatar-controlling-user's computer system, when the avatar is within the viewing region and the virtual object is within the avatar's attention region. The present invention is not limited to a particular range of viewing angles or distances between the avatar and the virtual object, but instead provides a mechanism enabling such viewing regions to be defined. Viewing regions may vary between different objects and between different server computer systems that provide a simulated environment. Therefore, the particular viewing regions described below are illustrative examples only.

In one embodiment of the invention, the method comprises generating an attention event in response to the detecting step and recording the attention event in a data storage means outside the computer-simulated environment. The method may further comprise recording an attention time during which the virtual object is within the attention region of the avatar simultaneously with the avatar being within the viewing region of the virtual object. The method may further comprise aggregating attention events for a plurality of avatars viewing a particular virtual object. In an alternative embodiment of the invention, a single recorded attention event and time may be processed for the purpose of determining which objects received significant attention from an individual computer user.

In one commercial application of the invention, a non-avatar virtual object for which attention monitoring is required comprises an advertisement (such as a 3D representation of an advertised product, or an advertisement or logo displayed on a surface of an object) that is hosted by a service provider within a virtual world, and the method further comprises the step of applying a charging metric to the aggregated attention events, to calculate billable charges for the attention given to the advertisement or product representation by the plurality of avatars. The service provider can then bill the provider of the advertised goods or services an appropriate amount that takes account of the effectiveness of the advertisement or product representation.

In another embodiment, the service provider may respond to information about the attention given to a non-avatar virtual object by changing the appearance, size or position of the object in the virtual environment. In other applications, the non-avatar virtual object may be a warning sign or an object displaying a set of instructions or displaying information associated with a product or service or event.

Methods according to the present invention may be implemented in computer program code, and this program code may be provided as a computer program product which is a commercially available article comprising program code recorded on a computer-readable recording medium.

Another aspect of the present invention provides a data processing system comprising:

means for defining a viewing region to be associated with a virtual object in a computer-simulated environment, wherein the viewing region comprises a region of the computer-simulated environment within which avatars are deemed to be capable of viewing the virtual object;

means for monitoring an attention region of an avatar within the computer-simulated environment;

means for detecting when the virtual object is within the attention region of the avatar simultaneously with the avatar being within the viewing region of the virtual object; and means for generating an attention event in response to said detecting.

The system preferably comprises data storage means for recording the attention event, although the generated attention event may be transmitted to a second data processing system for storing and processing.

BRIEF DESCRIPTION OF DRAWINGS

Embodiments of the invention are described below in more detail, by way of example only, with reference to the accompanying drawings in which.

DESCRIPTION OF EMBODIMENTS

Figure 1:
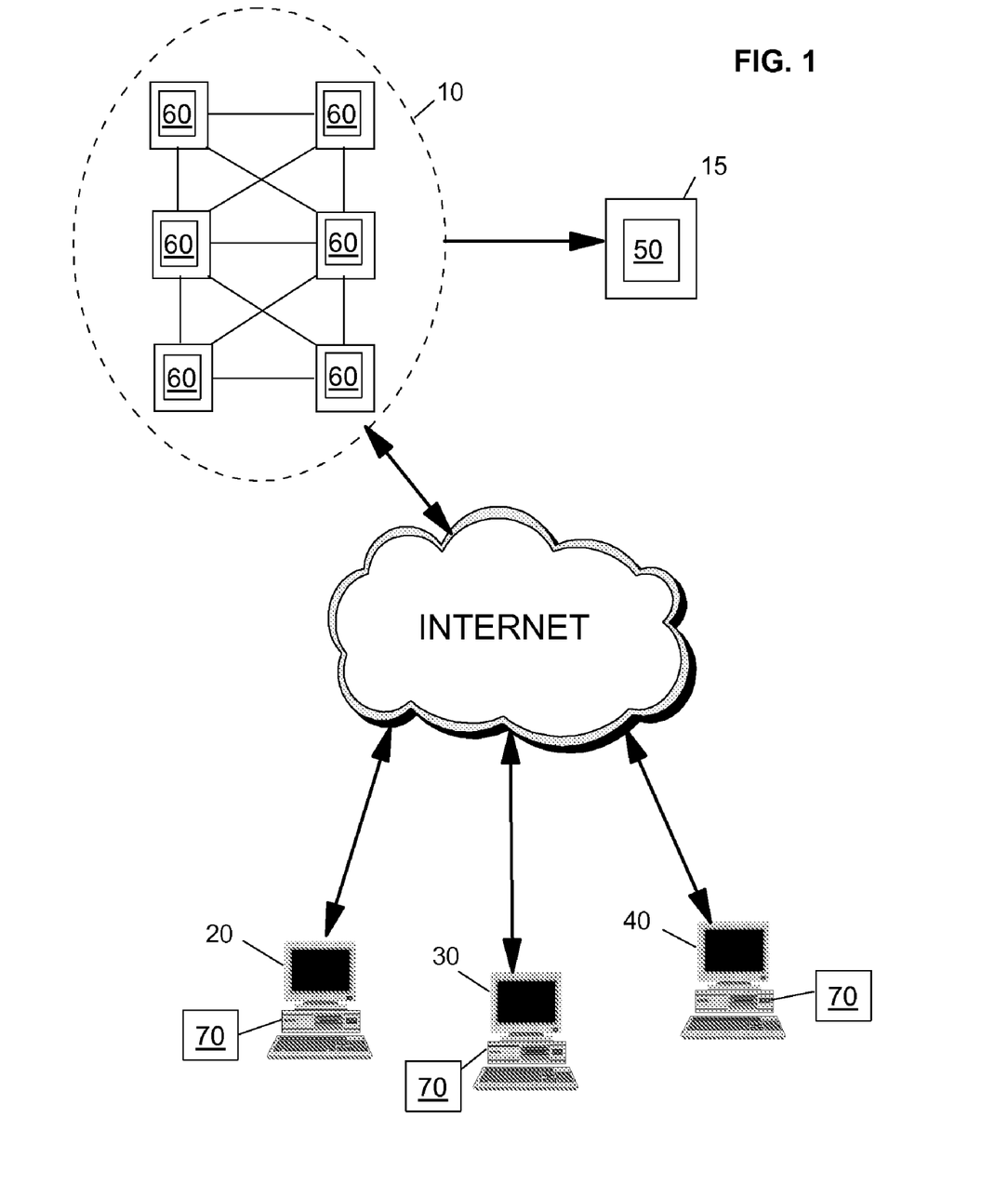
FIG. 1 is a schematic representation of a distributed computer network in which the present invention may be implemented.

FIG. 1 shows a distributed data processing network comprising a set of server data processing systems connected in a networked array 10. Although only a small number of servers are shown in FIG. 1, the server array may include hundreds of interconnected server systems. The server systems are accessible via the Internet, by each of a number (potentially a very large number) of client data processing systems 20,30,40. Simulation software 60 running on each server within the server array provides an immersive 3D computer-simulated environment. The computer-simulated environment is divided into a number of sectors that are each managed by one or more of the set of server computer systems, and a user can only interact with objects in one of the sectors at any time.

Users wishing to experience the 3D simulated environment require specialized client software (a viewer program 70) that will run on the user's data processing system 20,30,40. The user interacts with the simulation software 60 running on a respective one of the servers corresponding to a particular sector of the computer-simulated environment via his or her viewer program 70. Specifically, user inputs to the viewer program 70 are translated into instructions to navigate through the simulated 3D environment, and instructions to control operations that involve interacting with objects within the environment, and the instructions are sent to the server-based simulation software 60 via the Internet. As shown schematically in FIG. 2, the viewer program 70 includes program code 80 to render a 2D image of a portion of the simulated 3D environment that has been navigated to.

Figure 2:
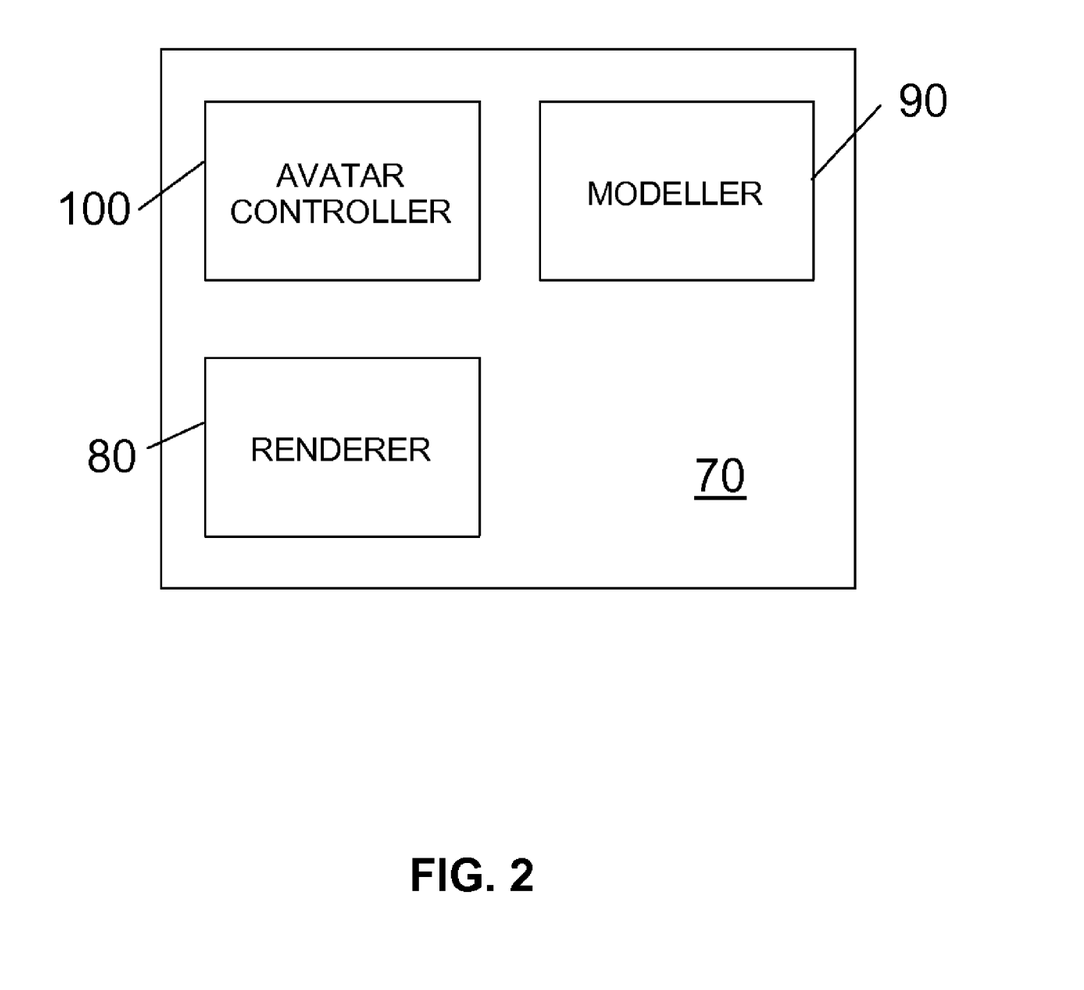
FIG. 2 shows components of a viewer program, for running on a client data processing system, according to an embodiment of the invention.

As provided in some known viewer programs for computer-simulated 3D environments, the viewer program 70 also comprises 3D modelling code 90 for selecting, and optionally customizing, an avatar that the user can then control via avatar controller code 100 to navigate through the simulated environment. The user interacts with other avatars and non-avatar virtual objects within the simulated environment via the user's own avatar. The viewer program 70 thus provides a mechanism for a user to pass instructions (represented by user-controlled avatar actions) to the simulation software 60 running on the server array 10, and the simulation software 60 determines the effects of the user's instructions on the simulated 3D environment and computes the results of the user's navigation through that environment.

In a typical interactive 3D environment, a user-controlled avatar's actions can affect other avatars and non-avatar objects within the environment and the user can view these affects. For example, one avatar may push another avatar or lift an object, and the software running on the server array will calculate simulated physical effects of this interaction and modify the simulated environment accordingly. These effects will be displayed on the display screens of any users whose avatars are currently viewing the relevant part of the simulated environment. In some example simulated 3D environments, such as in Second Life, this interaction includes a capability to create virtual objects such as buildings, furniture, vehicles and other objects that can then be uploaded into the simulated environment. Such uploaded objects, if accepted into the simulated environment, will be displayed to other users and those other users' avatars can interact with the new objects.

The viewer program renders, on a user's data processing apparatus display screen, the region of the computer-simulated environment which corresponds to a current avatar's field of view associated with the current position and orientation of the user's avatar. In some environments, the user's field of view is not based on the exact position of the eyes of the user's avatar, and the user is presented with a scene which includes a representation of the avatar within the simulated environment. Nevertheless, for the purposes of this description, the "user's field of view" is taken to be synonymous with the "avatar's field of view".

Figure 3A:
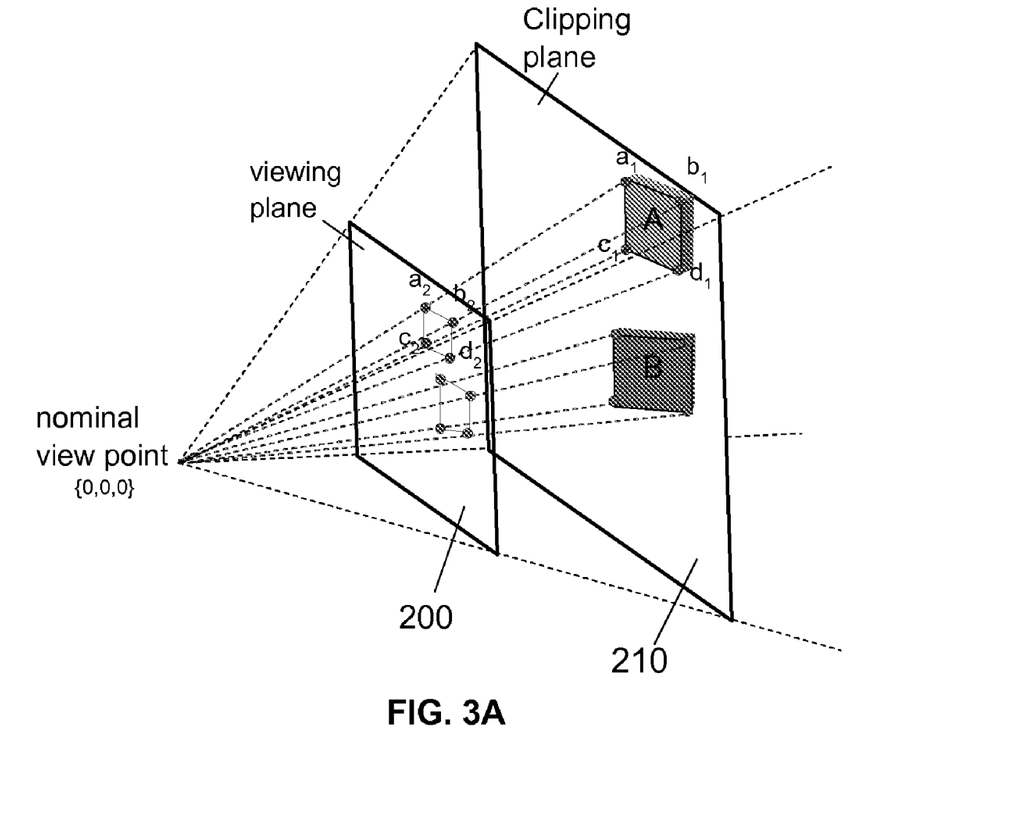
FIG. 3A is a schematic representation of objects within a computer user's field of view comprising a 3D portion of a computer-simulated environment that is selected by the position and orientation of the user's avatar within the computer-simulated environment, according to an embodiment of the invention.

Although not essential for the present invention, the avatar's field of view may be limited to a view depth corresponding to a defined distance away from the avatar; more specifically, this limited view depth is a defined distance from a viewing plane 200 that corresponds to the user's display screen as represented in FIG. 3A. In Second Life, this distance can be chosen by the user. A clipping plane 210 is defined at the defined distance behind the viewing plane, such that the avatar's field of view is the 3D volume defined by the truncated pyramid between the viewing plane and the clipping plane. Any features of the computer-simulated environment which are located further away from the viewing plane than the clipping plane are not downloaded to the user's computer and so are not rendered on the user's display screen. This clipping of distant details can improve performance as experienced by user's of the computer-simulated environment (reducing processing by the server software and reducing data downloads to the user's computer system).

A clipped field of view is represented schematically within FIG. 3A, in which objects A and B are within the viewable region between the viewing plane and clipping plane of the computer-simulated environment. The 3D volume between the clipping plane and the viewing plane that corresponds to the user's field of view is a truncated pyramid defined by the software running on the server array with reference to the 3D coordinates {X,Y,Z} of a nominal viewing point and three angles representing the user's direction of view. Program code for identifying the 3D volume of the computer-simulated environment that corresponds to the clipped field of view is well known in the art; as are processes for transforming points within a 3D coordinate system to a 2D viewing plane, and processes for rendering the transformed representation on a display screen.

Figure 3B:
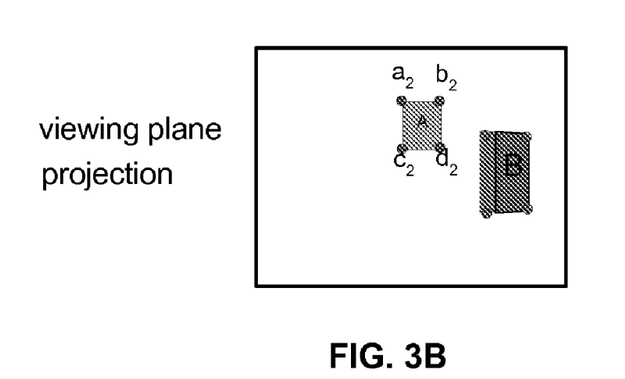
FIG. 3B shows how the two objects within FIG. 3A might appear on the user's display screen after being transformed onto a viewing plane and rendered on the user's display screen, according to an embodiment of the invention.

In the present embodiment, the transformation of an object, that is within the user's defined field of view, to a set of 2D coordinates for rendering on a display screen is performed by the server-based software 60 before transmitting data to the viewer software 70 running on the user's system. The program code 80 within the viewer program that processes data received from the server array can therefore focus on rendering images on the display without complex processing of the received data. Objects A and B will then appear on the user's display screen as represented in FIG. 3B. The data that is generated and stored for each object within the simulated environment includes a set of coordinates for a collection of points on the surface of each object, including the vertices of each surface of the object. The 3D coordinate data is stored in the server array as a set of floating point values that can be transformed into 2D coordinates for rendering on a computer user's display screen. For example, as shown in FIGS. 3A and 3B, vertices $\{a_1,b_1,c_1,d_1\}$ of 3D object A within the viewable 3D volume will be rendered in two dimensions at screen locations $\{a_2,b_2,c_2,d_2\}$.

For the purposes of this description of an embodiment of the invention, each avatar is considered to have an associated attention region corresponding precisely to that avatar's clipped field of view. Any object falling within the 3D volume of the computer-simulated environment that represents the avatar's attention region is a candidate for getting the user's attention, but additional conditions must be met before each object is considered to have received the attention of the avatar (as described below).

In other embodiments of the invention, an avatar's attention region may be defined as only a part of the avatar's field of view. For example, the avatar's attention region may have a more limited depth than the distance from the viewing plane to the clipping plane, such that an object may be rendered on the user's display screen and yet be deemed to be outside the avatar's attention region. In another example, the avatar's defined attention region may comprise a narrower angular range than the avatar's full field of view, corresponding to a narrower focus region at the centre of the avatar's field of view. A limited attention region comprising just a part of an avatar's field of view may be considered desirable when monitoring the attention given by avatars to objects within a computer-simulated environment, but an attention region corresponding precisely to the avatar's clipped field of view is considered satisfactory in the present embodiment.

The significance of the avatar's defined attention region for monitoring user activity and monitoring the effectiveness of objects within a computer-simulated environment is explained below.

The inventors of the present invention have determined that some objects may be located within an avatar's attention region and yet should not be considered to have received the attention of the avatar. In particular, many objects have particular viewable surfaces and the avatar should not be deemed to have focussed attention on the objects unless the particular viewable surfaces are within the avatar's attention region and can be viewed from an appropriate angle.

According to a first embodiment of the invention, viewing regions are defined for each of a set of objects within the computer-simulated environment. The objects within this set, for which attention monitoring is required, are identified when those objects are added to the computer-simulated environment. In particular, for each of a set of objects for which it is desired to monitor the attention given to those objects by avatar-controlling users, a set of one of more viewable surfaces are identified. This identification of viewable surfaces is preferably performed as an automated or semi-automated process, in response to an object creator identifying the object as requiring attention monitoring, before adding an object to the computer-simulated environment. Virtual objects are created by designers of the simulated environment, and the identification of viewable surfaces is performed by the designer's modelling software. However, in an environment that allows participating user's to create new objects, this identification of viewable surfaces may be performed within the 3D modelling code of the user's viewer program, before uploading the new object to the simulated environment.

A viewing region is then associated with each viewable surface for which attention monitoring is required, by determining the boundaries of a 3D volume within which avatars are deemed to be capable of effectively viewing the respective viewable surface of the object (and outside of which avatars are deemed to be unable to effectively view the object). The viewing region defined for a virtual object comprises the set of viewing regions defined for its identified viewable surfaces, which may be a single surface or a plurality of separate surfaces.

It should be noted that many objects will have viewable surfaces for which no attention monitoring is required. For example, a virtual television set which is inserted within a computer-simulated environment to display advertisements or video clips is likely to be a 3D object but attention monitoring may focus only on the screen that displays the video material. However, if the virtual television set is itself a 3D advertisement, that is inserted into the environment as a representation of the 3D design of the latest commercially available television set, other surfaces of the object may justify attention monitoring. For the purposes of the present patent specification, the term 'viewing region' is used to refer to an aggregation of viewing regions for an object, potentially comprising multiple overlapping volumes associated with multiple viewable surfaces of the object; but the term 'viewing region' is also used to refer to a single volume associated with a single viewable surface.

Figure 4:
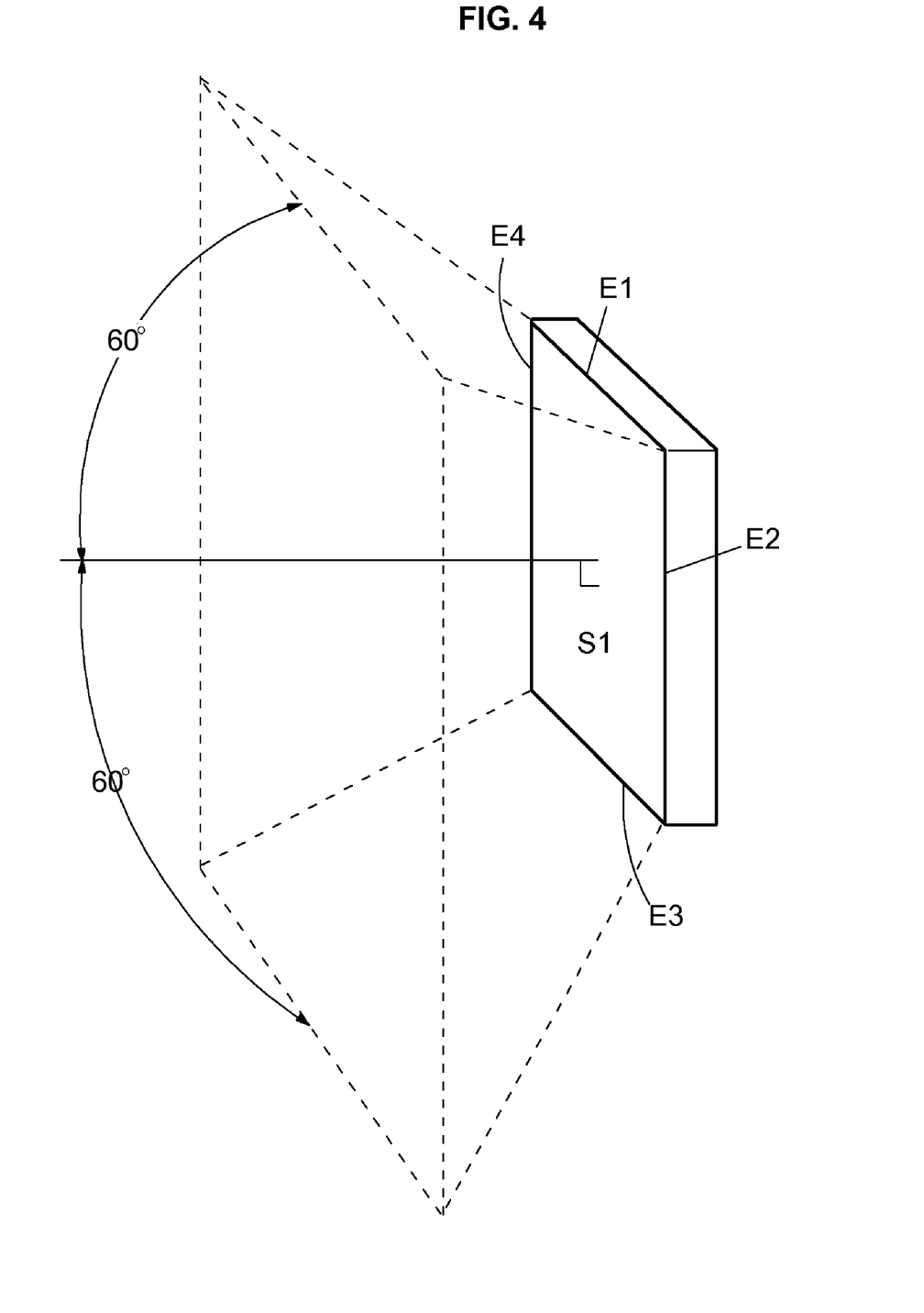
FIG. 4 is a schematic representation of a viewing region associated with a non-avatar virtual object within the computer-simulated environment, according to an embodiment of the invention.

In a first embodiment of the invention, non-avatar virtual objects that require monitoring are categorized as comprising flat viewable surfaces and/or curved surfaces, and a default viewing region is defined for each identified viewable surface. For a flat surface S1, as shown in FIG. 4, the boundaries of the 3D volume are defined by a set of planar bounding surfaces, each projecting from one of the edges E1,E2,E3,E4 of the surface S1 at an angle of 60 degrees from a line normal to the surface S1. For an example flat surface of a viewable object that has parallel edges E1,E3 at opposite extremities of the surface, the planar bounding surfaces that project from the parallel edges thus define a 120 degree range of viewing angles within which an avatar is deemed to be able to effectively view the flat surface.

For a curved surface, the boundaries of the 3D volume of the default viewing region can also be defined by a set of planar bounding surfaces, each projecting from an edge of the curved surface at an angle of 60 degrees from a line normal to the curved surface immediately adjacent the respective edge. However, the default viewing region can be modified when required, such that the range of viewing angles within which an avatar is deemed to be able to effectively view the curved surface can vary from one virtual object to the next. Some objects can be viewed effectively from within a 360 degree range (for example if the curved surface has no boundary edges within a particular plane, as in the case of a spherical or cylindrical object).

It will be understood by persons skilled in the art that the above-mentioned angle of 60 degrees from the normal represents only a first example implementation choice for a default viewing region. Alternative ranges of viewing angles may be defined which are larger or smaller than 60 degrees from the normal, and different acceptable viewing angles may be defined for different virtual objects. For example, a first range of viewing angles may be considered acceptable for a flat surface that presents an image such as a company logo, whereas a larger or smaller range of viewing angles may be considered acceptable for surfaces displaying text.

In one embodiment of the invention, the determination of a range of acceptable viewing angles for a surface displaying text is determined as follows. When the virtual object is added to the computer-simulated environment, a two-dimensional representation of the object is generated for each of a set of potential viewing angles (for example 55, 60, 65 and 70 degrees from the normal) and a text character recognition algorithm is applied to each two-dimensional representation. The range of acceptable viewing angles is determined by the largest angle from the normal within the set of potential viewing angles for which the text character recognition algorithm is able to recognize the text characters. For some viewing angles, the height and/or width of the text will be too compressed to be readable by a user, and the text character recognition algorithm is used to determine the maximum angle from the normal before that can be expected to occur.

In the first embodiment of the invention, the 3D volume corresponding to the viewing region of the virtual object is not only bounded by the set of planar surfaces projecting from the edges of a viewable surface, but also by one of a spherical surface or a flat surface representing a maximum distance from the centre of the viewable surface. Where the bounding surface defining this maximum distance comprises a flat surface, this flat surface is perpendicular to a line normal to the centre of the viewable surface. Thus, the 3D volume has a limited depth extending from the virtual object. The definition of this 3D volume is then stored in association with the virtual object in data storage of the server array that provides the computer-simulated environment.

Having defined a 3D volume or a set of volumes of the computer-simulated environment corresponding to the viewing region for a particular 3D virtual object, and having defined a 3D volume corresponding to the attention region of an avatar, it is then possible to monitor for 'collisions' between an object and an avatar's attention region that are simultaneous with collisions between the avatar and the object's viewing region. This detection of collisions exploits collision-determination technology that is well known in the art and is already implemented in commercially-available computer gaming and virtual world solutions. A novel feature of this implementation is that we are monitoring for two simultaneous collisions before an attention event is generated. This detection of simultaneous collisions is performed by the simulation software running on the particular server data processing system within the server array that is responsible for the sector of the computer-simulated environment in which the virtual object is located.

In the first embodiment of the invention, the simulation software generates an attention event in response to each determined 'dual collision' corresponding to a virtual object for which attention is to be monitored entering the attention region of an avatar, for an avatar that is simultaneously within the viewing region of the virtual object. That is, the monitoring of avatars' attention regions is only initiated when an avatar enters the 3D volume corresponding to a viewing region of one of the set of virtual objects for which attention is to be monitored. While the avatar is within the viewing region, the position of the 3D volume that corresponds to its attention region is monitored to detect collisions between the attention region and the particular virtual object for which monitoring has been initiated. This monitoring of avatars' attention may be performed simultaneously for multiple virtual objects that are within a particular sector of the computer-simulated environment, since one or more avatars may be within the viewing region of each of a plurality of virtual objects at the same time.

The attention event comprises a message identifying the particular virtual object that has received attention from an avatar, which message is sent to an attention event aggregator 50. As shown in FIG. 1, the attention event aggregator may comprise a component of a data processing system 15 that is outside the server array 10. In the present embodiment, the event aggregator 50 is implemented as a computer program that writes data to a data storage unit of its data processing system 15. The attention event aggregator maintains a record (for example a simple counter within memory of a respective data processing system) of attention events for each virtual object for which attention is to be monitored. This record of attention events can then be analyzed to determine the level of attention given to particular virtual objects. This analysis can be used for a number of applications, including determining the effectiveness of an advertisement or warning sign, either as an input to a advertising billing metric, or for comparison with an agreed 'quality of service' between advertisers or designers and providers of a computer-simulated environment, or to enable modification of the simulated environment if objects are deemed to be ineffective.

In an alternative embodiment of the invention, the attention events are not as simple as an indication that a 'collision' has occurred. Instead, each attention event includes metadata for the particular collision which is additional to the identification of the virtual object. For example, this metadata may include the identity of the avatar which gave attention to the object and/or the duration of the collision. In some embodiments, attantion events are only generated if the 'collision' (between the object and the avatar's attention region simultaneously with collision between the avatar and the object's viewing region) occurs for more than a threshold period of time—for example 5 seconds.

In yet another embodiment, collisions are 'weighted' according to the maximum proportion of the 2D representation of the avatar's attention region that is filled by the virtual object. A distant object that only fills 5% of the user's display screen at any time during the collision will receive a weighting of 0.05, whereas an object that fills 50% of the display screen for a period during the collision will receive a weighting of 0.50. Weightings may also be applied according to the proximity of an object to the centre of an avatar's field of view (i.e. the closest proximity to an avatar's "line of sight" that is achieved by an object during a collision, such that the "line of sight" is treated as a focus direction of the user). Attention events for objects that are central to the avatar's field of view are given a higher weighting than attention events for objects that are peripheral. Weightings may be a multiple of factors such as duration of collision, closest proximity to avatar's "line of sight", and maximum proportion of display screen filled by the object during the collision.

Figure 5:
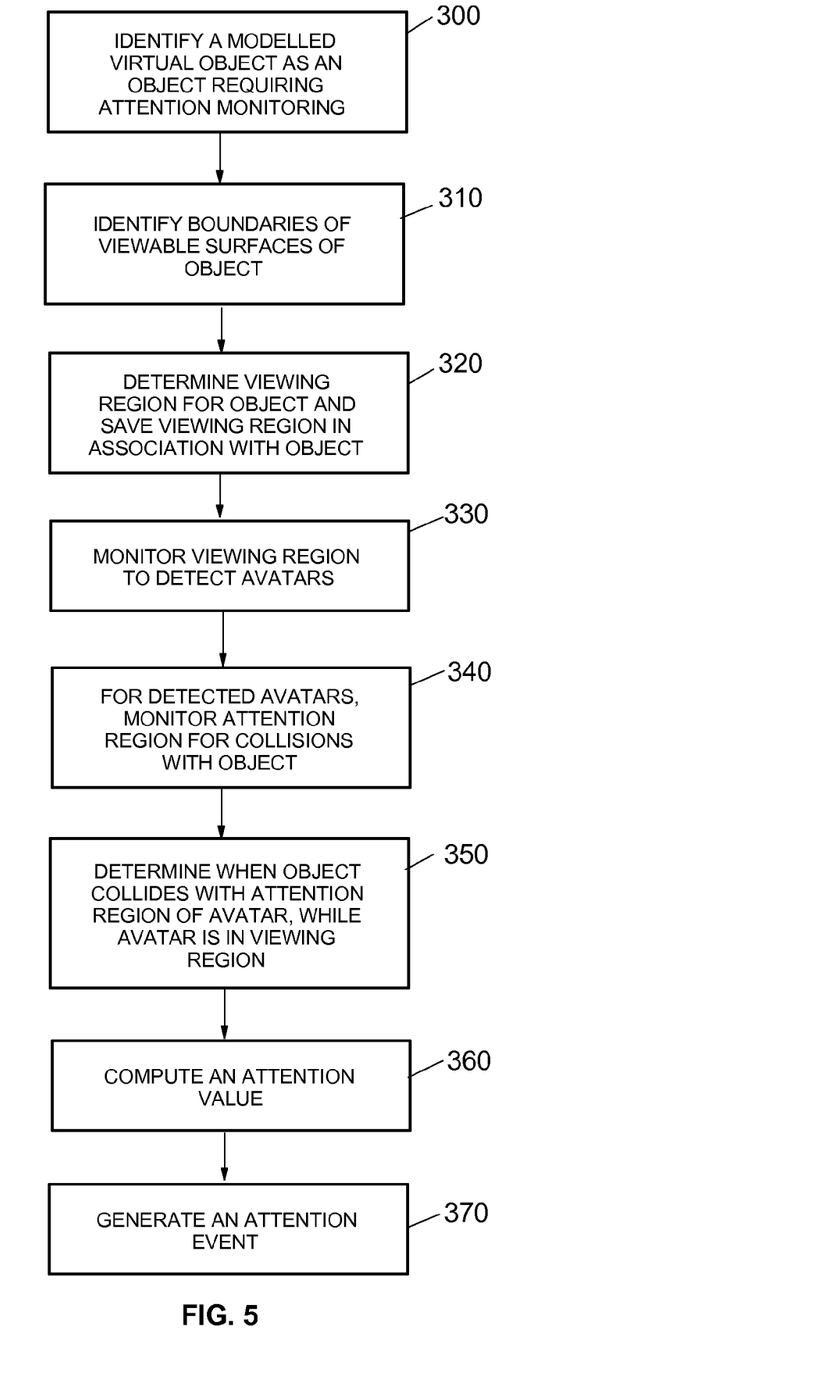
FIG. 5 is a schematic flow diagram representing a sequence of steps of a method according to an embodiment of the invention.

According to one embodiment, the monitoring method and calculation of an attention metric proceeds as described below and as shown in FIG. 5:

1. A virtual object B is created using 3D modelling code and, before adding the object to the simulated environment, the object creator or another computer operator identifies 300 the object B as requiring attention monitoring and identifies the viewable surfaces of the object B.
2. In response to a request to add the virtual object to the simulated environment, the coordinates of the vertices that define the set of boundary edges of the viewable surface are extracted 310 from the definition of the virtual object. A logical 3D volume is then defined 320 as object B's viewing region, by projecting a bounding plane at a threshold viewing angle from each boundary edge of each viewable surface of the virtual object B to define a volume between the bounding planes (and aggregating multiple volumes if the object has multiple viewable surfaces)
3. The viewing region is then monitored 330, comparing the viewing region with the locations of avatars A1, A2, A3 within the same sector of the computer-simulated environment, to identify any avatars within the object's viewing region.
4. For each detected avatar A1 within the viewing region, monitor 340 the avatar's current attention region (the 3D volume defined by projecting from a nominal view point through the viewing plane along the line of sight of the avatar to a second plane at a threshold distance from the avatar, as described above). This attention region corresponds to the avatar-controlling user's clipped field of view, subject to any defined depth limitation (threshold distance) or any defined focus region (limited angular range within the avatar's total field of view) that is associated with the avatar A1.

5. Determine 350 whether B is within the attention region of A1. Avatars within the viewing region of an object will not cause an attention event to be generated if they are at a distance from the object which is greater than the avatar's threshold viewing distance that bounds the avatar's attention region, or if the avatar's current orientation is such that the object falls outside the avatar's current attention region. In many cases, an avatar's threshold viewing distance will be greater than the threshold viewing distance that is defined for the object's viewing region, such that the relevant limits are the threshold viewing distance defined for the viewing region together with the angular fields defined for each of the avatar's attention region and the object's viewing region.

6. If B is within this viewing region, calculate the ratio R of the total area of the viewing plane which is formed by projecting the 3D representation of the viewable surface of B onto the 2D viewing plane. Integrate R over the period of time for which B is within the attention region of A1, while A1 is within the viewing region of B, to determine 360 an attention value.

7. Generate 370 an attention event including an identification of object B and the calculated attention value.

It will be appreciated by persons skilled in the art, that the above described embodiments of the invention are provided for illustrative purposes only and, while various features described herein provide novel advantages over known solutions, the particular illustrative embodiments should not be considered limiting on the scope of the invention. Various equivalents, modifications and extensions to the above described embodiments are within the scope of the present invention as described herein.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of automated monitoring of attention given to a virtual object in a computer-simulated environment by at least one avatar-controlling computer user, comprising:

associating, by a processor, a viewing region with the virtual object, wherein the viewing region comprises a region of the simulated environment within which avatars are deemed to be capable of acceptably viewing the virtual object;

monitoring, by the processor, an attention region for an avatar;

determining, by the processor, that a text character recognition algorithm is able to recognize text displayed on the virtual object from a viewing angle of the avatar to the virtual object at a distance of the avatar from the displayed text;

detecting, by the processor, when the virtual object is within the attention region of the avatar simultaneously with the avatar being within the acceptable viewing region of the virtual object based on the determination that the text character recognition algorithm is able to recognize text displayed on the virtual object from the viewing angle of the avatar to the virtual object at the distance of the avatar from the displayed text; and generating, by the processor, an attention event in response to said detecting.

2. The method of claim 1, further comprising:

transmitting, by the processor, said generated attention event to an event aggregator; and recording, by the processor, said generated attention event within aggregate attention event information for the virtual object in a data storage means.

3. The method of claim 2, wherein recording, by the processor, said generated attention event within aggregate attention event information for the virtual object in the data storage means comprises:

recording an attention time during which the virtual object is within the attention region of the avatar simultaneously with the avatar being within the acceptable viewing region of the virtual object.

4. The method of claim 2, wherein recording, by the processor, said generated attention event within aggregate attention event information for the virtual object in the data storage means comprises updating an attention event counter.

5. The method of claim 2, wherein the virtual object comprises an advertisement and wherein the method further comprises applying, by the processor, a charging metric to the aggregated attention event information, to calculate, by the processor, billable charges for attention given to the advertisement by avatars.

6. The method of claim 5, further comprising:
comparing, by the processor, the aggregated attention event information with a desired attention level to determine, by the processor, whether the attention given to the virtual object satisfies the desired attention level;
responsive to a determination, by the processor, that the monitored attention fails to satisfy the desired attention level, modifying, by the processor, at least one appearance characteristic of the virtual object.

7. The method of claim 6, wherein modifying, by the processor, at least one appearance characteristic of the virtual object comprises at least one modification selected from the set consisting of:
adding animation to the virtual object;
changing the color of the virtual object;
changing the position of the virtual object;
changing the orientation of the virtual object;
changing the font size of text within the virtual object;
changing the pixel density of the virtual object; and
adding non-visual characteristics to the virtual object.

8. The method of claim 6, wherein modifying, by the processor, at least one appearance characteristic of the virtual object comprises at least one modification selected from the set consisting of:
adding animation to the virtual object;
changing the color of the virtual object;
changing the font size of text within the virtual object;
changing the pixel density of the virtual object; and
adding non-visual characteristics to the virtual object.

9. The method of claim 5, further comprising:
comparing, by the processor, the aggregated attention event information with a desired attention level to determine, by the processor, whether the attention given to the virtual object satisfies the desired attention level;
responsive to a determination, by the processor, that the monitored attention fails to satisfy the desired attention level, repositioning, by the processor, the virtual object in the computer-simulated environment.

10. The method of claim 5, wherein the charging metric is based on a percentage of the attention region for the avatar that is taken up by the virtual object.

11. The method of claim 1, wherein the virtual object in the computer-simulated environment is one of a plurality of virtual objects, wherein each virtual object in the plurality of virtual objects comprises an acceptable viewing region defined by an acceptable viewing angle.

12. The method of claim 11, wherein a first acceptable viewing angle of a first virtual object in the plurality of virtual objects is different than a second acceptable viewing angle of a second virtual object in the plurality of virtual objects.

13. The method of claim 1, wherein the virtual object comprises at least one viewable surface having a set of bounding edges, and wherein the acceptable viewing region associated with a first viewable surface comprises a three-dimensional (3D) volume within the virtual environment which volume is defined by a set of planes that each project at a threshold viewing angle from one of the set of bounding edges of the first viewable surface of the virtual object.

14. The method of claim 13, wherein, for a flat viewable surface, the set of planes project from said edges at an acute angle to a line normal to the viewable surface.

15. The method of claim 14, wherein the acceptable viewing region is defined by the processor using an automated process in response to selection of said acute angle by a creator of the virtual object.

16. The method of claim 14, wherein, the set of planes that project from said edges at the acute angle to the line normal to the viewable surface project at a predetermined angle selected from one of 55 degrees, 60 degrees, 65 degrees, and 70 degrees.

17. The method of claim 13, wherein the acceptable viewing region is defined by the processor using an automated process in response to identification of the at least one viewable surface by a creator of the virtual object.

18. The method of claim 13, wherein, the virtual object comprises a spherical surface or a cylindrical surface and the viewable surface of the virtual object projects 360 degrees around each curved surface of the virtual object.

19. A data processing system comprising:
means for defining a viewing region to be associated with a virtual object in a computer-simulated environment, wherein the viewing region comprises a region of the computer-simulated environment within which avatars are capable of acceptably viewing the virtual object;
means for monitoring an attention region of an avatar within the computer-simulated environment;
means for determining that a text character recognition algorithm is able to recognize text displayed on the virtual object from a viewing angle of the avatar to the virtual object at a distance of the avatar from the displayed text;
means for detecting when the virtual object is within the attention region of the avatar simultaneously with the avatar being within the acceptable viewing region of the virtual object based on the determination that the text character recognition algorithm is able to recognize text displayed on the virtual object from the viewing angle of the avatar to the virtual object at the distance of the avatar from the displayed text; and
means for generating an attention event in response to said detecting.

20. The system of claim 19, further comprising:
means for recording, in a data storage means, said generated attention event within aggregate attention event information for the virtual object.

21. A computer program product comprising program readable code recorded on a non-transitory recording medium for controlling operations of a data processing apparatus on which the program code executes to perform a method of automated monitoring of attention given to a virtual object in a computer-simulated environment by at least one avatar-controlling computer user, the method comprising:
associating a viewing region with the virtual object, wherein the viewing region comprises a region of the simulated environment within which avatars are deemed to be acceptably capable of viewing the virtual object;
monitoring an attention region for an avatar;

determining that a text character recognition algorithm is able to recognize text displayed on the virtual object from a viewing angle of the avatar to the virtual object at a distance of the avatar from the displayed text;

detecting when the virtual object is within the attention region of the avatar simultaneously with the avatar being within the acceptable viewing region of the virtual object based on the determination that the text character recognition algorithm is able to recognize text displayed on the virtual object from the viewing angle of the avatar to the virtual object at the distance of the avatar from the displayed text; and generating an attention event in response to said detecting.

* * * * *